United States Patent [19]

Kukreja

[11] 4,315,290

[45] Feb. 9, 1982

[54] APPARATUS FOR SHIFTING THE MAGNETIC READ/WRITE HEAD CARRIAGE IN A FLOPPY DISK DRIVE UNIT

[75] Inventor: Jagmohan S. Kukreja, Claremont, Calif.

[73] Assignee: Siemens Corporation, Iselin, N.J.

[21] Appl. No.: 111,226

[22] Filed: Jan. 11, 1980

[51] Int. Cl.³ .......................... G11B 21/08; G11B 5/55
[52] U.S. Cl. ...................................................... 360/106
[58] Field of Search .................................. 360/106, 99

[56] References Cited

U.S. PATENT DOCUMENTS

| 3,950,783 | 4/1976 | Herring et al. | 360/106 |
| 4,134,143 | 1/1979 | Ragle et al. | 360/99 |
| 4,139,877 | 2/1979 | Townsend | 360/106 |

FOREIGN PATENT DOCUMENTS

| 1218601 | 6/1966 | Fed. Rep. of Germany . |
| 2500516 | 12/1974 | Fed. Rep. of Germany . |
| 2704091 | 8/1977 | Fed. Rep. of Germany . |

Primary Examiner—Robert S. Tupper
Attorney, Agent, or Firm—Spellman, Joel & Pelton

[57] ABSTRACT

A floppy disk magnetic information storage and retrieval unit having a magnetic read/write head carriage and apparatus for shifting the carriage radially with respect to the floppy disk to effect data transfer with selectable tracks on the disk. The carriage shifting apparatus includes a lead screw shaft; a carriage nut arranged on the shaft and moveable axially when the shaft is rotated; and a stepper motor having a permanent magnet rotor arranged coaxially with, and rigidly attached to one end of the shaft. Two bearings are provided to hold the shaft and rotor combination at opposite ends of the shaft.

6 Claims, 5 Drawing Figures

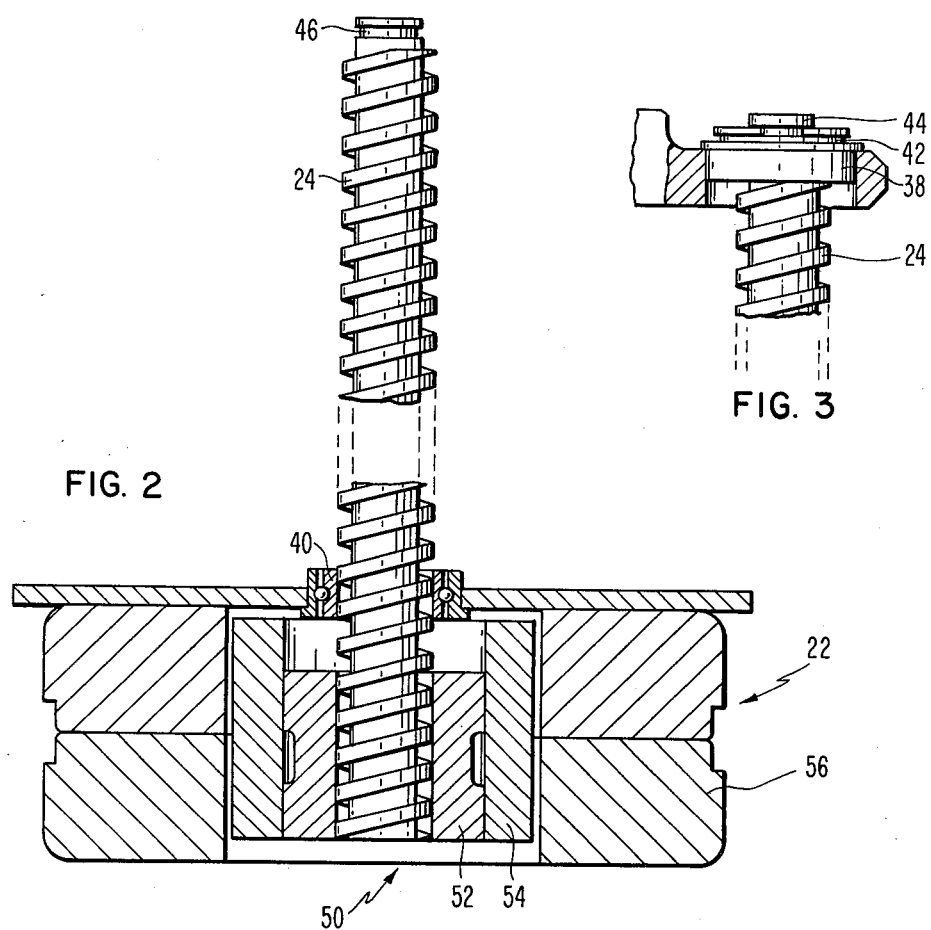
FIG. 2
FIG. 3
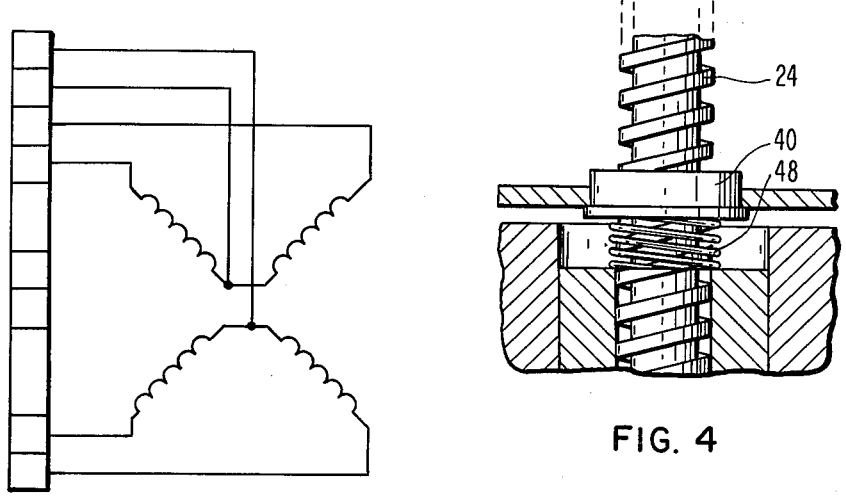
FIG. 4
FIG. 5

APPARATUS FOR SHIFTING THE MAGNETIC READ/WRITE HEAD CARRIAGE IN A FLOPPY DISK DRIVE UNIT

BACKGROUND OF THE INVENTION

The present invention relates to a floppy disk drive unit and, in particular, to apparatus for shifting the magnetic read/write head carriage in a floppy disk drive unit to align the magnetic heads with tracks on the disk.

Commercially available floppy disk drives comprise an assembly for holding and rotating a floppy disk and a separate assembly for holding and shifting the position of magnetic heads with respect to the rotating floppy fisk. In a conventional system, this latter assembly includes a carriage, moveable radially relative to the floppy disk such that the magnetic heads are positioned accurately with respect to tracks on the disk.

The U.S. Pat. No. 4,139,877 to Townsend discloses a magnetic read/write head carriage assembly which is shifted by means of a stepper motor and a coaxially connected "lead screw" which operates, upon rotation, to move the carriage, and the magnetic heads arranged thereon, in a direction radial to the center driven floppy disk. By controlling the increments of rotation of the stepper motor, the magnetic heads may be aligned to effect data transfer with selectable tracks on the disk.

As is conventional, the lead screw and stepper motor are provided with a total of three bearings: one on each side of the rotor in the stepper motor and a third at the end of the lead screw farthest from the stepper motor. This bearing arrangement requires either precise alignment, so that all three bearings are arranged along the common axis, or a universal joint at the point where the lead screw connects to the stepper motor rotor shaft.

SUMMARY OF THE INVENTION

It is an object of the present invention to provide a stepper motor and lead screw for a floppy disk unit which avoids the problems of misalignment encountered in the prior art.

This object, as well as other objects which will become apparent in the discussion that follows, are achieved by rigidly connecting the lead screw shaft with the stepper motor rotor and supporting this lead screw shaft and rotor combination with only two bearings: one in the region of the stepper motor and the other at the opposite end of the lead screw shaft.

More particularly, the invention provides a floppy disk magnetic information storage and retrieval unit having a magnetic read/write head carriage and apparatus for shifting the carriage radially with respect to the floppy disk to effect data transfer with selectable tracks on the disk. The carriage shifting apparatus includes a lead screw shaft, a carriage nut arranged on the shaft and moveable axially when the shaft is rotated, and a stepper motor having a permanent magnet rotor arranged coaxially with, and rigidly attached to one end of the shaft. Two bearings are provided to hold the shaft and rotor combination at opposite ends of the shaft.

The construction according to the present invention not only eliminates the necessity of aligning three bearings, and/or providing a universal joint between the screw shaft and the stepper motor rotor, it also requires fewer parts, simplifies assembly and permits the use of an inexpensive, permanent magnet rotor stepper motor.

In a preferred embodiment of the present invention, the screw portion of the lead screw shaft extends along the shaft substantially from one end to the other, and the shaft extends coaxially through the permanent magnet rotor. In this configuration, both bearings surround the shaft on the screw portion thereof.

BRIEF DESCRIPTION OF THE DRAWINGS

FIG. 2 is a cross-sectional view showing the stepper motor and the lead screw shaft employed in the floppy disk unit shown in FIG. 1.

FIG. 3 is a detailed view showing one bearing supporting the lead screw shaft.

FIG. 4 is a detailed view showing another bearing supporting the lead screw shaft.

FIG. 5 is a wiring diagram of the stepper motor employed in the floppy disk unit of FIG. 1.

DESCRIPTION OF THE PREFERRED EMBODIMENT

Figure 1:
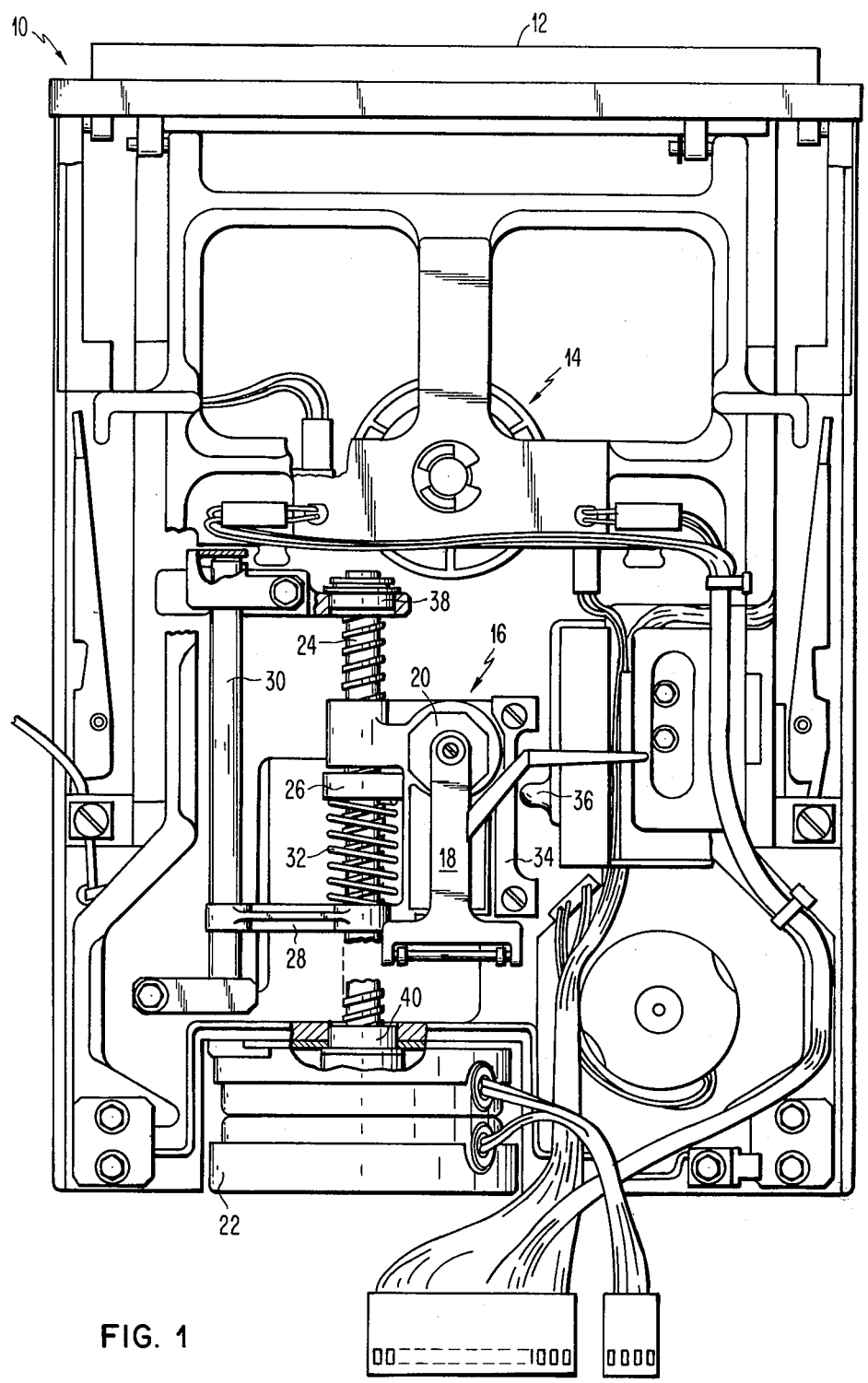
FIG. 1 is a top plan view of a floppy disk unit equipped with a magnetic read/write head carriage and apparatus, according to the invention, for shifting the carriage radially with respect to a floppy disk.

The preferred embodiment of the invention will now be described with reference to FIGS. 1–5 of the drawings. Identical elements illustrated in the various figures are designated with the same reference numerals.

FIG. 1 shows a floppy disk unit 10 in top plan view. This unit has an opening 12 at one end to receive a floppy disk and a disk drive hub structure 14 for holding the disk at its center and rotating the disk during operation. In order to effect data transfer with selectable tracks on the disk the unit includes a carriage assembly 16 supporting at least one arm 18 which carries a magnetic read/write head 20. The carriage is moved in a radial direction relative to the center driven floppy disk by means of a stepper motor 22 and a lead screw shaft 24. Rotation of the screw shaft 24 is translated into linear movement of the carriage by a carriage nut 26 arranged to mate with the helical screw portion of the shaft. The carriage assembly 16 is prevented from rotating with the screw shaft by an arm 28 which slides along a carriage guide shaft 30 that is rigidly clamped at its end to the floppy disk unit. A carriage spring 32 is provided to eliminate play between the carriage nut 26 and the screw shaft 24. A track stop 34 interacts with a projection 36 on the floppy disk unit to prevent accidental, excessive movement of the carriage in the radial direction.

The stepper motor 22 employed in the floppy disk unit is a permanent magnet rotor motor. Such a motor is available, for example, from North American Philips Controls Corp., Cheshire, Conn., under the designation "Series 82700". A suitable motor has a step angle of 7°30' a pull-in rate of 300s/s (375 rpm) and a power consumption of 8 watts. FIG. 5 is a wiring diagram for this type of motor.

As shown in greater detail in FIGS. 2–4, the rotating parts of the screw shaft and stepper motor assembly are supported by only two bearings: a first flanged bearing 38 at the free end of the shaft opposite the stepper motor and a second flanged bearing 40 in the region of the stepper motor. Both bearings 38 and 40 surround the screw shaft 24 along the screw portion thereof. Axial alignment of the shaft is maintained by a washer 42 and a retaining ring 44 which slips into a groove 46 at the end of the shaft 24. A stator spring 48 is provided in the stepper motor to bias the shaft in the axial direction, thereby preventing "play".

The shaft 24 directly supports the permanent magnet rotor 50 of the stepper motor. The shaft is pressed into a sleeve 52 which, in turn, supports the permanent magnet 54. These parts are also held by an adhesive such as epoxy glue.

The stator portion 56 of the stepper motor containing the windings is rigidly attached to the floppy disk unit, either by clamping or by an adhesive.

There has thus been shown and described a novel stepper motor and shaft assembly which fulfills all the objects and advantages sought therefor. Many changes, modifications, variations and other uses and applications of the subject invention will, however, become apparent to those skilled in the art after considering this specification and the accompanying drawings which disclose the preferred embodiment of the invention. All such changes, modifications, variations and other uses and applications which do not depart from the spirit and scope of the invention are deemed to be covered by the invention which is limited only by the claims which follow.

I claim:

1. A magnetic recording device having a carriage supporting at least one magnetic head and means for shifting said carriage in a radial direction relative to a center driven, pliant magnetic disk to effect data transfer with selectable tracks on at least one side of the disk, the improvement wherein said means for shifting said carriage comprises, in combination:

(a) a rotatable shaft having a helical screw portion;

(b) a carriage nut arranged on said screw portion and moveable in the axial direction of said shaft when said shaft is rotated, thereby to move said carriage in said radial direction;

(c) a stepper motor having a permanent magnet rotor arranged coaxially with and rigidly attached to one end of said shaft for selectively rotating said shaft;

(d) a first bearing disposed adjacent said rotor for rotatably holding both said rotor and said shaft in the region of said motor; and (e) a second bearing disposed adjacent the end of said shaft opposite said motor for rotatably holding said shaft at said opposite end;

whereby said shaft and said rotor are held in position only by said first and second bearings.

2. The improvement recited in claim 1, wherein said screw portion extends along said shaft substantially from one end to the other, and wherein at least one of said first and second bearing surrounds said screw portion.

3. The improvement defined in claim 1, wherein said first bearing is disposed on said shaft at the end thereof attached to said rotor.

4. The improvement defined in claims 2 or 3, wherein both said first and said second bearing surround said screw portion.

5. The improvement defined in claim 1, wherein said shaft extends coaxially through said permanent magnet rotor.

6. The improvement defined in claim 5, wherein said screw portion extends along said shaft substantially from one end to the other.

* * * * *